(12) United States Patent
Rajagopalan et al.

(10) Patent No.: US 10,473,474 B2
(45) Date of Patent: Nov. 12, 2019

(54) SYSTEM AND METHOD FOR VEHICLE ENERGY ESTIMATION, ADAPTIVE CONTROL AND ROUTING

(71) Applicant: GM Global Technology Operations LLC, Detroit, MI (US)

(72) Inventors: Sal S. V. Rajagopalan, Bloomfield Hills, MI (US); Eric Wood, Arvada, CO (US); Jeff Gonder, Arvada, CO (US)

(73) Assignee: GM Global Technology Operations LLC, Detroit, MI (US)

( * ) Notice: Subject to any disclaimer, the term of this patent is extended or adjusted under 35 U.S.C. 154(b) by 78 days.

(21) Appl. No.: 15/027,130

(22) PCT Filed: Oct. 3, 2014

(86) PCT No.: PCT/US2014/059120
§ 371 (c)(1),
(2) Date: Apr. 4, 2016

(87) PCT Pub. No.: WO2015/051289
PCT Pub. Date: Apr. 9, 2015

(65) Prior Publication Data
US 2016/0245662 A1    Aug. 25, 2016

Related U.S. Application Data

(60) Provisional application No. 61/886,960, filed on Oct. 4, 2013.

(51) Int. Cl.
*G01C 21/34*    (2006.01)

(52) U.S. Cl.
CPC ............... *G01C 21/3469* (2013.01)

(58) Field of Classification Search
CPC .................................. G01C 21/3469
See application file for complete search history.

(56) References Cited

U.S. PATENT DOCUMENTS

| | | | |
|---|---|---|---|
| 5,913,917 A | 6/1999 | Murphy | |
| 8,204,640 B2* | 6/2012 | Tani | B60K 6/445 180/65.265 |
| 8,589,076 B2* | 11/2013 | Hamilton, II | G06Q 10/047 320/109 |
| 9,379,559 B2* | 6/2016 | O'Connell | H02J 3/008 |
| 2009/0259363 A1 | 10/2009 | Li et al. | |
| 2010/0010732 A1 | 1/2010 | Hartman | |
| 2010/0179714 A1* | 7/2010 | Tani | B60K 6/365 701/22 |

(Continued)

OTHER PUBLICATIONS

International Search Report and Written Opinion dated Jan. 13, 2015 for related PCT Patent Application No. PCT/US2014/059120.

*Primary Examiner* — Jerrah Edwards
(74) *Attorney, Agent, or Firm* — Quinn IP Law

(57) ABSTRACT

In various embodiments the present disclosure provides a system and a method for estimating energy usage in a vehicle. The system includes hardware that perform certain operations that include receiving data associated with a route to be taken by the vehicle. The operations include determining, based on the data associated with the route and a state of the vehicle, an estimate corresponding to the energy that would be used by the vehicle when traversing a segment of the route.

13 Claims, 9 Drawing Sheets

(56) References Cited

U.S. PATENT DOCUMENTS

| | | | |
|---|---|---|---|
| 2011/0029168 A1* | 2/2011 | Talberg | B60K 6/48 |
| | | | 701/22 |
| 2012/0040438 A1 | 2/2012 | Penzes et al. | |
| 2012/0232783 A1 | 9/2012 | Calkins et al. | |
| 2013/0066552 A1* | 3/2013 | Hamilton, II | G01C 21/3469 |
| | | | 701/527 |
| 2013/0204471 A1* | 8/2013 | O'Connell | H02J 3/008 |
| | | | 701/22 |

* cited by examiner

FIG. 3
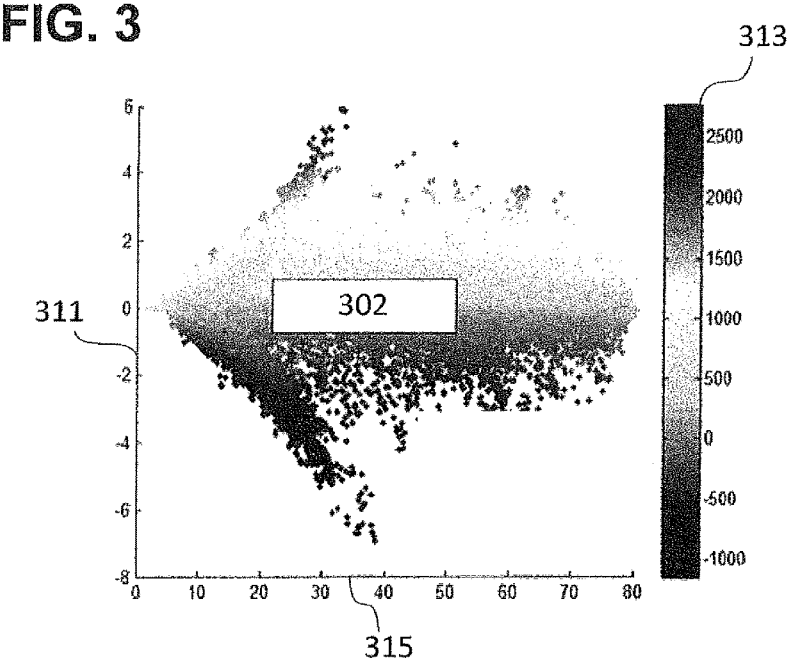
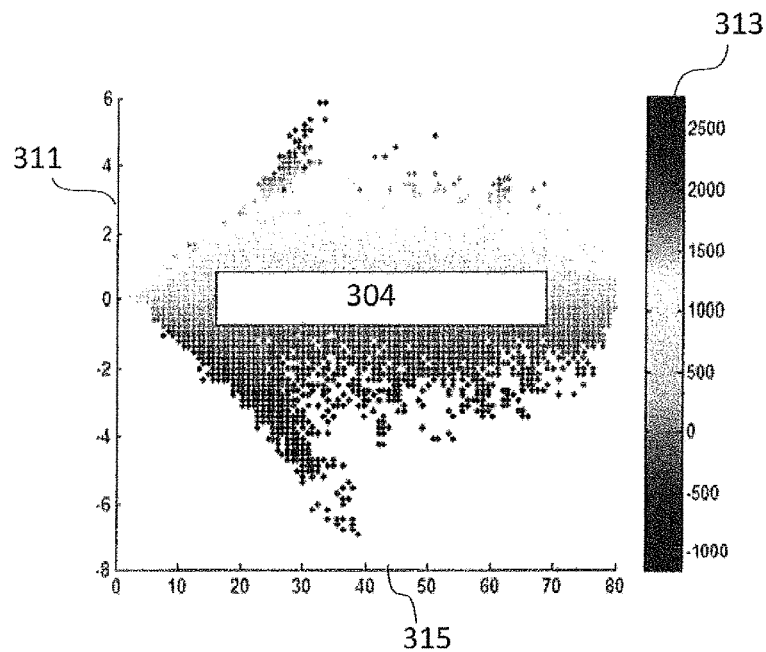

SYSTEM AND METHOD FOR VEHICLE ENERGY ESTIMATION, ADAPTIVE CONTROL AND ROUTING

CROSS-REFERENCE TO RELATED APPLICATIONS

The present application claims priority from U.S. Provisional Patent Application No. 61/886,960, filed on Oct. 4, 2013, the content of which is incorporated herein in its entirety.

STATEMENT OF GOVERNMENT LICENSE RIGHTS

This invention was made with U.S. Government support under CRADA CRD-11-457 between General Motors, LLC and the National Renewable Energy Laboratory (NREL) and under Contract No. DE-AC36-08GO28308 between the United States Department of Energy and Alliance for Sustainable Energy, LLC, the Manager and Operator of NREL. The U.S. Government has certain rights in this invention.

TECHNICAL FIELD

The present disclosure generally relates to systems and methods for vehicle energy estimation and, more particularly, to route selection and adaptive vehicle control based on vehicle energy estimation.

BACKGROUND

In the fields of vehicle telematics and navigation, there are algorithms for recommending potential travel routes from a given origin to a desired destination. Such potential routes may be presented as candidate routes from which a vehicle user may choose to travel. Further, in the field of vehicle energy use prediction, there are techniques for estimating vehicle energy consumption as a function of the vehicle's driving cycle/speed profile.

SUMMARY

To predict vehicle energy consumption over a specified route that has not yet been driven, a driving cycle/speed profile associated with that route is needed. Using such profile, the energy that the vehicle would expend by traveling from an origin to a destination via the specified route can be predicted.

The embodiments disclosed herein enable the prediction of the energy that a vehicle would expend while traversing a route or a segment of the route, wherein the route has not yet been traveled by the vehicle or generally, where there is no drive cycle data associated with the vehicle for the route. In sum, the disclosed embodiments may be directed at solving at least the aforementioned problem of the related art, as well as other problems of the related art that will become apparent throughout the disclosure.

In one illustrative embodiment, the present disclosure provides a method for estimating energy usage in a vehicle. The method includes receiving, by a computer that has a processor, data associated with a route. The method further includes determining, by the computer and based on the data associated with the route and a state of the vehicle, an estimate corresponding to the energy that would be used by the vehicle when traversing at least a segment of the route.

In another illustrative embodiment, the present disclosure provides a system for estimating energy usage in a vehicle. The system includes a processor and a memory. The memory stores instructions that when executed by the processor cause the processor to perform certain operations. The operations, in one implementation, include receiving data associated with a route. Further, the operations include determining, based on the data associated with the route and a state of the vehicle, an estimate corresponding to the energy that would be used by the vehicle when traversing a segment of the route.

In yet another illustrative embodiment, the present disclosure provides a method for a selecting an optimum route to be taken by a vehicle from a plurality of candidate routes. The method includes receiving, by a computer, data for each route of the plurality of candidate routes. The method further includes determining, by the computer and based on the data for each route of the plurality of candidate routes, a plurality of estimates, each estimate of the plurality of estimates corresponding to an energy expenditure that the vehicle would incur when taking a specific route from the plurality of candidate routes. The method may further include selecting the optimum route from the plurality of candidate routes.

Additional features, advantages, as well as the structure and operation of various embodiments are described in detail below with reference to the accompanying drawings. It is noted that the disclosure is not limited to the specific embodiments described herein. The embodiments are presented for illustrative purposes only. Additional embodiments will be readily apparent to persons skilled in the relevant art(s) based on the teachings of the present disclosure.

BRIEF DESCRIPTION OF THE DRAWINGS

Illustrative embodiments may take form in various components and arrangements of components. The embodiments are shown in the accompanying drawings, throughout which like reference numerals may indicate corresponding or similar parts in the various figures. The drawings are only for purposes of illustrating the embodiments and are not to be construed as limiting the disclosure. Therefore, given the following enabling description of the drawings, the novel aspects of the present disclosure should become evident to a person of ordinary skill in the relevant art(s).

FIG. 3 illustrates simulated and trained energy usage maps, according to an exemplary embodiment.

DETAILED DESCRIPTION

While illustrative embodiments are described herein for particular applications, it should be understood that the present disclosure is not limited thereto. Those skilled in the relevant art(s) and with access to the teachings provided herein will recognize additional modifications, applications, and embodiments within the scope thereof and additional fields in which the present disclosure would be of significant utility.

Embodiments of the present disclosure allow the energy expenditure of a vehicle to be predicted for a route that the vehicle has not yet traveled. The embodiments may confer several advantages. As just one example of many, the embodiments allow significant reductions in fuel consumption for a vehicle, such as vehicles having a dual powertrain—e.g., an electric powertrain and a conventional fuel powertrain. Specifically, the predicted energy expenditure for an untraveled route may be used to schedule an operation protocol that minimizes fuel consumption during the trip. In one such example, given an estimate of the energy that a vehicle would use over a route, the vehicle may be programmed, directed, or instructed, to use the engine (i.e., to use fuel) at highway speeds during the trip and to use the electric powertrain (i.e., a battery) at residential speeds during the trip. Adaptively alternating between these two modes of operation provides overall reduction in fuel consumption for the trip. Such fuel consumption reduction leads to monetary savings and increased compliance with environmental standards.

Figure 1:
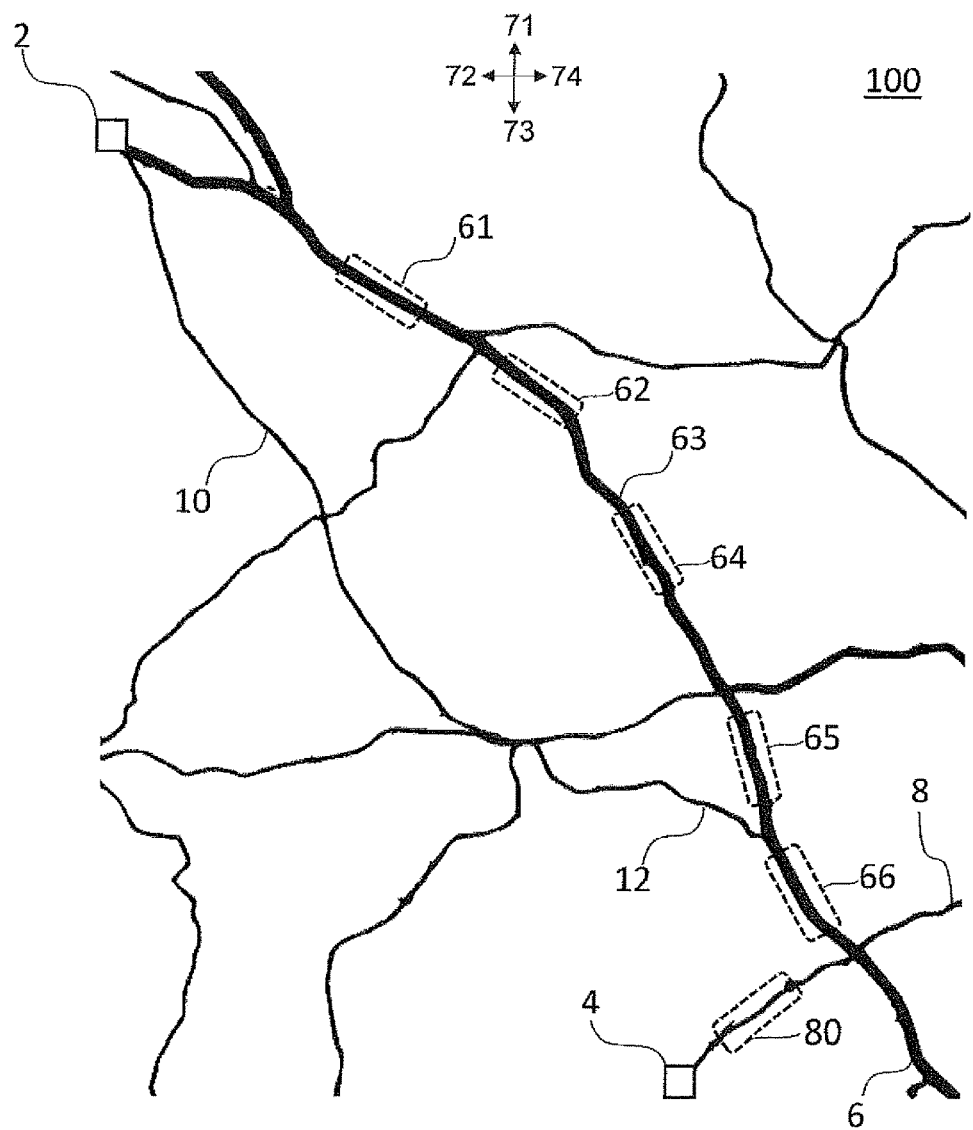
FIG. 1 illustrates a map and a route in the context of which embodiments of the present disclosure may be used to adaptively control a vehicle's mode of operation.

FIG. 1 illustrates a map 100 and a route in the context of which embodiments of the present disclosure may be used. Directions 71, 72, 73, and 74 may represent north, west, south, and east directions, respectively.

The embodiments may be used to adaptively control a vehicle's mode of operation, as described above, when the vehicle is travelling via a route defined on map 100. In some embodiments, the route may not have been traveled previously by the vehicle. In alternate embodiments, the route may have already been traveled previously but some or all of the data required for predicting energy usage does not exist.

With reference to FIG. 1, a first point 2 and a second point 4 may be an origin point and a destination point, respectively. As such, a candidate route may be the path starting at first point 2 and ending at second point 4 through roadway 6 and roadway 8. As will be apparent below and as one would expect, there are more than one route by which one may travel from first point 2 to second point 4. Embodiments of the present disclosure may also be used with these other candidate routes.

FIG. 1 illustrates several segments of the candidate route formed by first point 2, second point 4, roadway 6, and roadway 8. They are segments 61-66 on roadway 6 and segment 80 on roadway 8. While only these segments are shown, the route may be partitioned in less or more segments without departing from the scope of the teachings presented herein. Furthermore, the segments may be adjoined, and they may or may not form the totality of the route. In other words, in some embodiments, the entire route may be partitioned into segments, while in alternative embodiments, only a portion of the route may be partitioned.

In one embodiment, after determining the candidate routes that the vehicle may use to travel from first point 2 to second point 4 in FIG. 1, representative drive cycle metrics are obtained using information relating to the road segment type (such as functional class and speed category from the underlying road layer), traffic data, driver aggression, intersection and traffic sign/signal location. The data may be extracted from matching the map defined by the plurality of candidate routes with map data available from commercially vendors or providers. The data may then be used to obtain drive cycle metrics for each segment of each candidate route. The drive cycle metrics may be at least one of average speed, average acceleration, road grade (i.e., the rate of change of elevation of the roadway), and stops per mile (or another unit) over each segment of a candidate route. In embodiments of the present disclosure, the derived drive cycle metrics may be fed into a high-level lookup table model and trained against detailed model or test data for a particular vehicle powertrain in order to make energy use predictions.

The following paragraphs describe how the drive cycle metrics may be derived, consistent with the general description provided above. In order to establish the correlation between road type/travel scenario information and predicted cycle characteristics, a large number (e.g., thousands) of second-by-second real-world driving profiles may be used. Such data may be collected with global positioning system (GPS) devices. As an example, this data may be found archived in the United States National Renewable Energy Laboratory (NREL) Transportation Secure Data Center (TSDC).

Figure 2:
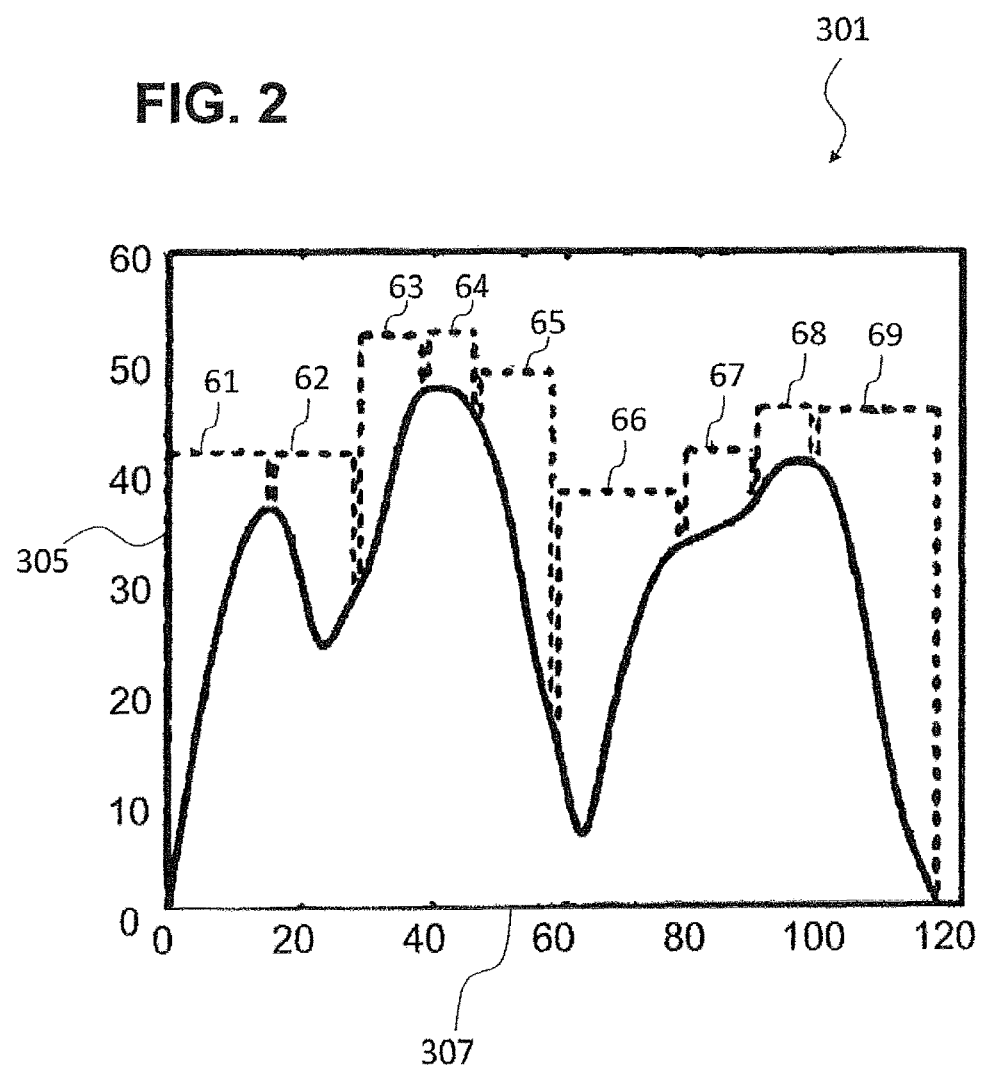
FIG. 2 illustrates speed data from a vehicle traversing a road segment.

After matching the TSDC driving profiles to the underlying road layer (as described above), the driving profiles are sub-divided into smaller increments, such as the 0.1 mile "nanotrips" illustrated in FIG. 2. In order to establish correlations that could be applied to a road under consideration, the driving profiles need not traverse the exact route under consideration but simply a variety of road segments. As such, it is possible to correlate the speed and acceleration characteristics for these nanotrips to the road functional class (FC) being traversed (FC=1 corresponds to high-throughput interstate travel and FC=5 corresponds to low-throughput neighborhood streets).

This correlation results in good predictions of average speed and acceleration characteristics simply given information on the functional class of the current and the previous 0.1 mile segment of the given driving route. Additional precision may be obtained by factoring in additional inputs, such as real-time traffic speeds over the given driving segment. In embodiments of the present disclosure, the drive cycle metrics may already be available via a database.

Further, in the disclosed embodiments, energy expenditure may be estimated by creating cycle-metric-based performance maps (trained ahead of time against a large amount of detailed simulation and/or test data). As such, the energy use predictions can be made even without a detailed speed profile prediction for the expected driving route. This procedure is described below.

According to embodiments of the present disclosure energy use predictions may be made from representative cycle metrics (such as average speed, acceleration, road grade, etc.), without requiring a detailed speed profile (which would not exist for applications such as green/eco-routing and dynamic control scheduling). The approach involves generating detailed energy use maps for the specific vehicle of interest from detailed simulations and/or test data collected over thousands of drive cycles. Once obtained, these energy use maps may be built are computationally light to implement for a green routing or dynamic control application.

In one exemplary embodiment, a Chevrolet Volt® was used as a test platform. This vehicle is an extended range electric vehicle (EREV), and the energy use maps included both electricity and fuel-consumption relationships, and considered charge-depleting (CD) operation, charge-sustaining (CS) operational modes in order to track vehicle state-of-charge (SOC) via the electricity consumption relationships and determine the correct operating mode (CHEVROLET VOLT is a registered trademark of General Motors, LLC, of Detroit, Mich.). In order to build the cycle-metric-based energy maps, a model was used to simulate the vehicle's performance under certain driving conditions and, in addition, test data was collected from the vehicle in an initial phase of CS operation, even at a high vehicle battery SOC.

The simulation and test results extracted from the thousands of evaluated driving profiles were divided into small increments as in the 0.1 mi "nanotrips" identified in FIG. 2, wherein the x-axis (307) is the distance in miles and the y-axis (305) is the speed in miles per hour. It should be noted that the aforementioned units (and all of those used herein) are exemplary; in alternate embodiments, other units may be used without departing from the scope and spirit of the disclosure.

Each nanotrip (such as the one in chart 301) was then characterized with respect to its average speed and acceleration as well as electricity and fuel consumption (with reference also to the battery SOC at the start of the nanotrip). Chart 302 in FIG. 3 provides an illustration of all the nanotrip simulation results when the vehicle engine was off. In FIG. 3, the x-axis (315) is the average speed in miles per hour, and the y-axis (311) is the acceleration in miles per hour per second. The simulation results (313) were overlaid in the average speed and acceleration cycle characteristic space. Chart 302 shows consistent electric consumption rates for nanotrips with similar cycle characteristics, which enables the data to be binned into a look-up map as shown in chart 304. This look-up map may thus be stored and readily accessible to the vehicle when an energy usage prediction is needed for a route that has not yet been travel or for which it has no data.

The described look-up maps/correlations define what is needed to predict energy use (fuel and electricity consumption) from speed and acceleration cycle characteristics. The predictions may further be refined by establishing similar correlations for additional cycle segment characteristics such as road grade. Embodiments of the present disclosure may also provide a grade-based translation model that predicts the grade-adjusted electric consumption rates based only on the zero-grade electric rate as an input.

Further, embodiments of the present disclosure may also make use of existing telematics technology to provide relevant data of impending speed/acceleration/grade in order to perform high level mode scheduling. In the absence of these data, the vehicle would simply operate in an all-electric mode (i.e., a charge depleting mode) until reaching some threshold SOC and then maintaining the current SOC by alternating between an all-electric mode and a hybrid mode (i.e., a charge sustaining mode) with no attempt to optimize sequencing.

Embodiments of the present disclosure may be implemented on vehicles having hybrid-electric powertrains, and they may make use of advanced telematics systems to implemented novel route-connected control algorithms that may assist in optimizing overall vehicle efficiency. Embodiments of the present disclosure provide the capability to enable one such application, namely route-connected control for optimally scheduling control modes of a hybrid-electric powertrain vehicle.

Enabled by a forward-looking energy prediction model based on the exemplary techniques discussed above, embodiments of the present disclosure may optimally schedule control modes such that total energy use along a specified route is minimized.

Further, embodiments of the present disclosure may be used to optimally schedule/tune high-level (e.g., all-electric mode vs. charge-sustaining mode) and/or low-level control decisions (e.g., specific variables/settings in the control code based on the vehicle's location along a route). Furthermore, implementation could also occur on-board the vehicle and/or in a cloud computing environment.

Figure 4:
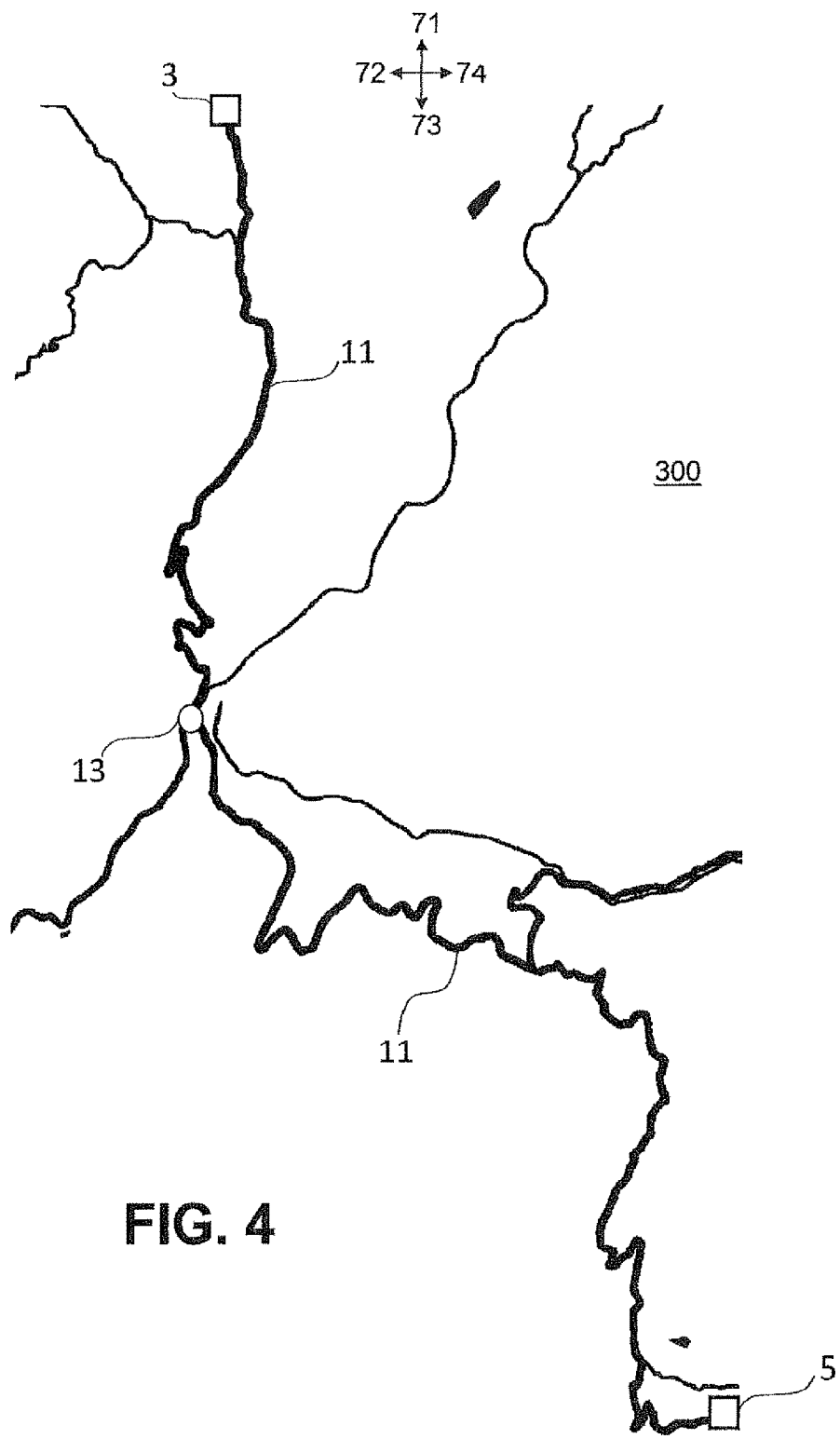
FIG. 4 shows a map and a route in the context of which embodiments of the present disclosure may be used.
Figure 5:
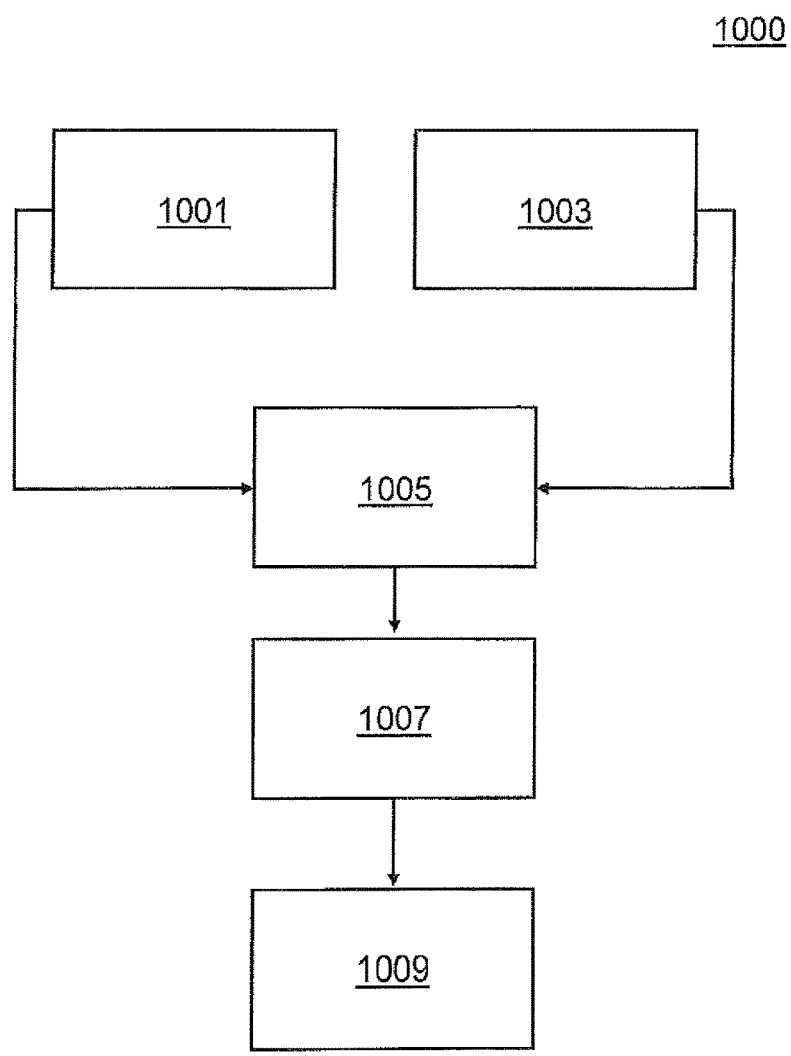
FIG. 5 illustrates a method of estimating energy and scheduling an operation protocol, according to an embodiment.
Figure 6:
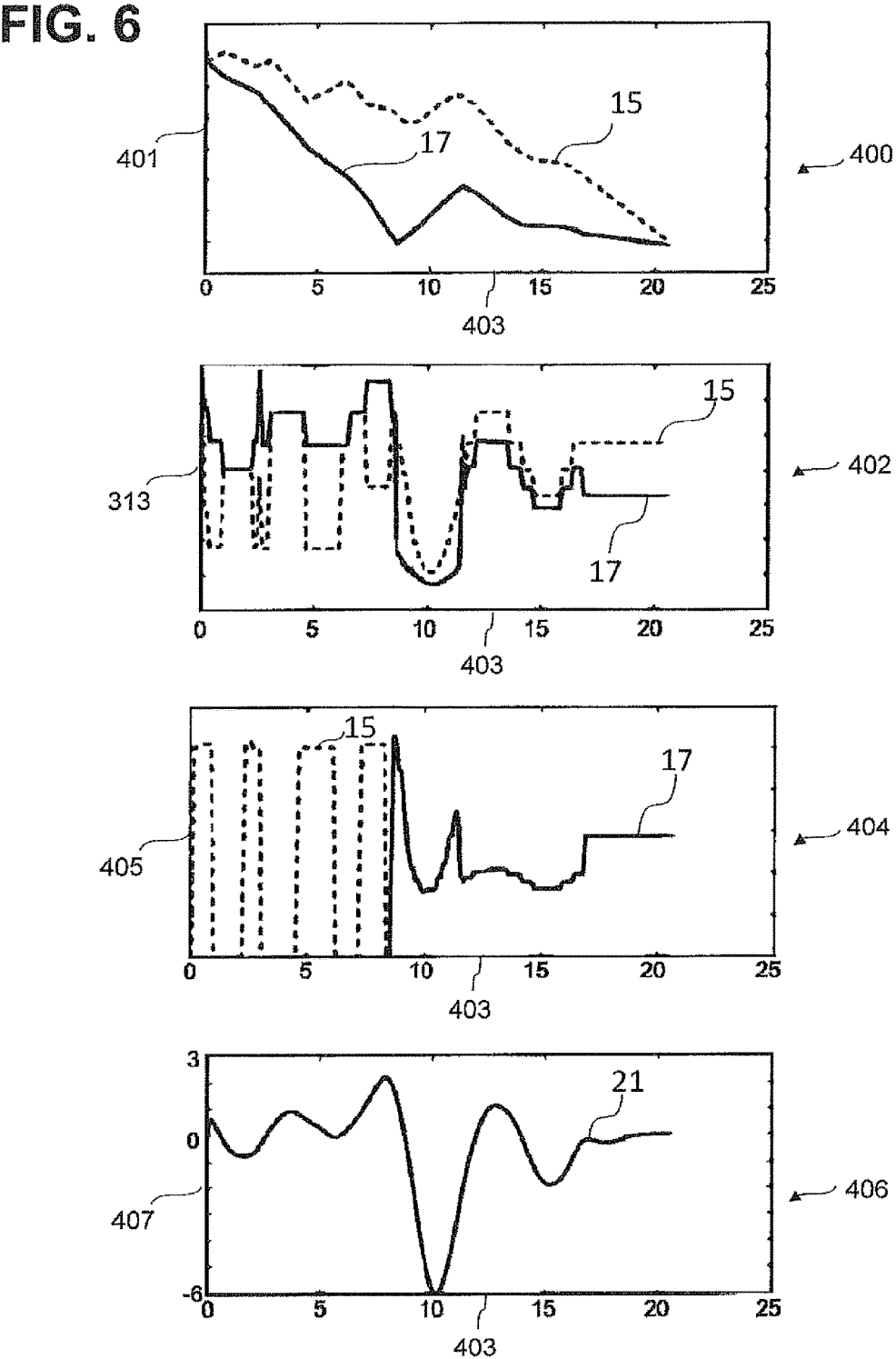
FIG. 6 illustrates several charts related to implementing the exemplary method of FIG. 5.

FIGS. 4, 5, and 6 describe a scheduling/tuning application, according to an embodiment of the present technology. FIG. 4 illustrates a map 300 and a candidate route defined by first point 3, second point 5, and roadway 11. Point 13 may be a transition point, or waypoint, at which, for example, the SOC reaches a pre-defined threshold below which the vehicle ceases to operate exclusively in an all-electric mode and then switches between alternating between the all-electric and the hybrid modes of operation in order to maintain the current SOC.

FIG. 5 illustrates a method 1000 for scheduling/tuning the operation of the vehicle so as to minimize fuel consumption, according to an embodiment. In an embodiment, method 1000 may include the scheduling of two high-level control modes: a nominal all-electric (AE) mode (in which the vehicle relies exclusively on battery power for propulsion) and a hybrid mode (in which some mix of fuel and electricity is used to propel the vehicle, potentially increasing the state of charge (SOC) of the high voltage battery). Given a target for the desired SOC at the end of the trip (i.e., at second point 5 in FIG. 5), the method may include evaluating the energy prediction model assuming an exclusive all-electric operation, acknowledging that such operation may not be feasible in practice due to battery power limitations at low SOC. Energy estimation (at step 1005) may be achieved as described previously, i.e., following the reception of the cycle metrics associated with the route (step 1001), and following the reception of data regarding the vehicle like its current SOC and fuel tank level (step 1003). In an embodiment, method 1000 may include estimating energy for the route twice, by using two different types of energy usage maps. In another embodiment, even if a destination is not provided (i.e. a specified route that includes a starting point and end point), method 1000 may include using historical data (such as a time of the day) to predict the drive cycle through a short horizon and still provide an optimization protocol schedule while the vehicle travels to that horizon.

FIG. 6 illustrates several charts that may result from implementing method 1000. In FIG. 6, various data are plotted against a distance traveled by the vehicle (x-axes 403). Chart 400 illustrates a SOC on y-axis 401. The SOC may be expressed in a percentage of the battery's maximum capacity or using an absolute metric, such as voltage or charge. Method 1000 may include determining the SOC for a nominal case, i.e. with no scheduling (trace 17), and for an optimal case (trace 15) obtained with scheduling. Further, method 1000 may include estimating the energy expenditure for the nominal case (traces 17 in charts 402 and 404 of FIG. 6) and the optimal case resulting from scheduling (traces 15 in charts 402 and 404). In chart 402, the electric rate (y-axis 313) is shown for both nominal (17) and optimal (15) cases. In chart 404, the expenditure of fuel (y-axis 405) is shown for nominal (17) and optimal (15) cases. In some embodiments, the expenditure of fuel may be expressed as a fuel rate in gallons per mile.

Further, method 1000 may include scheduling segments of the trip for hybrid operation as necessary until a predefined final SOC target is met or exceeded (and other constraints such as location of engine turn on are imposed). In some cases, method 1000 may include scheduling no hybrid operation at all if the nominal final SOC exceeds the target SOC. Further, in method 1000, scheduling a protocol (step 1007) may entail prioritizing trip segments for hybrid operation based on a cost/benefit ratio of their inclusion in the schedule. The cost of substituting hybrid operation for all-electric mode may be defined as the amount of estimated fuel consumption to be incurred by substituting a mode of operation for each segment. Similarly, the benefit of each substitution may be defined as the reduction in electric depletion rate afforded by substituting the hybrid operation for an all-electric operation over a particular segment. Once a protocol has been scheduled, method 1000 may include applying the protocol to the vehicle (step 1009).

In one embodiment of method 1000, the criterion for engaging hybrid operation during the trip may be given by Equation 1. Other constraints, such as the location and number of engine starts on the trip to meet emissions regulations, may also be imposed.

$$SOC_{final,\ optimal} \geq SOC_{final,\ nominal} \quad\quad (eq.\ 1).$$

In other words, Equation 1 requires that the optimum SOC at the end of the trip in the optimal schedule be greater than or equal than the nominal SOC at the end of the trip in the nominal schedule. One of skill in the art will readily recognize that such a criterion is not intended to be limiting but for illustrative purposes only. Other relationships between optimal/final SOC and nominal/final SOC may be used as a criterion, without departing from the teachings of the present disclosure.

Furthermore, method 1000 may engage in substituting the mode of operation such that a particular cost/benefit ratio is minimized for a segment and/or for the overall route. For instance, a cost/benefit ratio that minimizes fuel may be used as shown in Equation 2.

$$Cost/Benefit = Fuel_{hybrid\ mode}/(Elec_{AE\ mode} - Elec_{hybrid\ mode}) \quad\quad (eq.\ 2).$$

In other words, Equation 2 entails that a cost/benefit ratio may be defined as the ratio of the fuel to be expended in hybrid mode to the difference the electric rate in all-electric mode and the electric rate in hybrid mode. As such, minimizing the cost/benefit figure shown in equation 2 entails decreasing battery depletion rate while minimizing fuel use. As in the case of equation 1, one of skill in the art will readily recognize that other cost/benefit figures may be used. For example, another embodiment could maximize an overall system efficiency that includes all propulsion system efficiencies.

FIG. 6 illustrates a simulated result of method 1000 as applied to the Volt®, for a case where the vehicle travels along the route shown in FIG. 4. In FIG. 6, where ordinate values are absent, the data shown have been normalized for clarity. (VOLT is a registered trademark of General Motors, LLC, of Detroit, Mich.).

Chart 400 illustrates a nominal SOC (trace 17) over the trip's length and the optimal SOC (trace 15), as obtained by scheduling and implementing a protocol according to method 1000. Chart 402 illustrates optimal (trace 15) and nominal (trace 17) electric rate expenditures during the length of the trip. Chart 404, on the other hand, shows the optimal (trace 15) fuel expenditure and the nominal (trace 17) fuel rate expenditure during the length of the trip. The data revealed that the fuel consumption in the optimal schedule was on the order of 25% less than the fuel consumed in the nominal schedule.

Lastly, chart 406 shows a road grade profile (trace 21) for the route taken in FIG. 4. The road grade may be expressed as a percentage characterizing the rate of change of elevation (y-axis 407). As previously mentioned, energy estimates may be obtained for a given road-grade profile. In this exemplary simulation of method 1000, the road grade profile shown in trace 21 was used to determine the appropriate energy estimates for segments along the trip.

Figure 7:
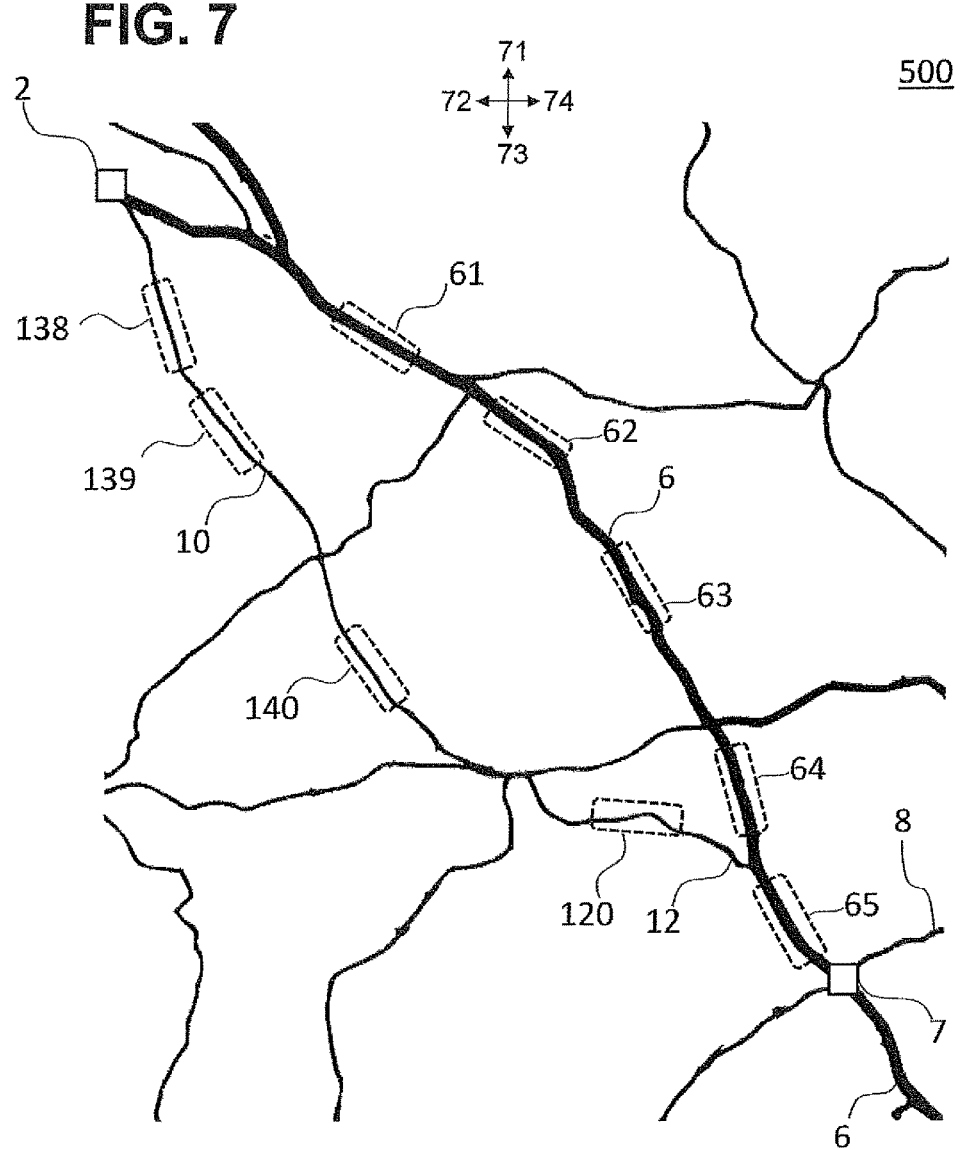
FIG. 7 illustrates several routes that a vehicle may undertake and for which embodiments of the present disclosure may be used to adaptively control the vehicle's operation as well as selecting an optimum route.
Figure 8:
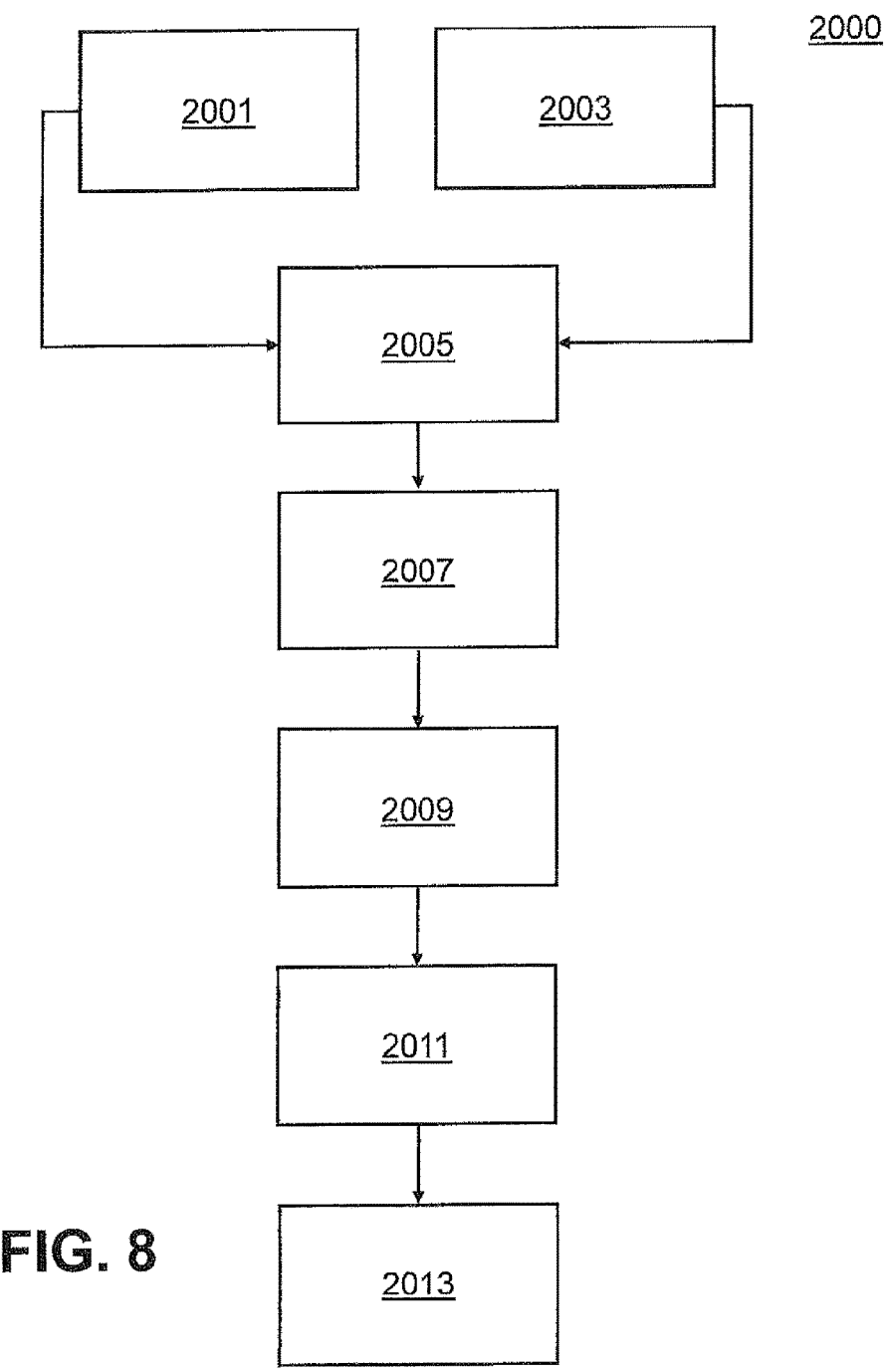
FIG. 8 illustrates a method of estimating energy, selecting an optimum route, and scheduling an operation protocol, according to an exemplary embodiment.

FIG. 7 illustrates a map 500 in which a plurality of candidate routes exists between a first point 2 and second point 7. Exemplary candidate routes may be given by the paths defined by points 2, 7, and roadway 6, or by points 2, 7, rodways 10 and 12. As before, each route may be partitioned into segments for computing the appropriate energy expenditures for each route. Segments along roadway 10 consist of or at least include segments 138-140. Along roadway 6, the segments consist of or at least include segments 61-69. And on roadway 12, there may be a segment 120, for instance. According to exemplary embodiments of the present disclosure, a method 2000 may be implemented to select the optimum route from a plurality of candidate routes, such as the ones shown in FIG. 7. Such application may be thought of as green routing (or ecological routing), wherein a vehicle may be directed to a route that results in the minimum amount of fuel consumption. Method 2000 is discussed with respect to FIG. 8.

Method 2000 may include receiving route data (step 2001) associated with a plurality of candidate routes. The data may include drive-cycle metrics such as those described above, and these metrics may be associated with one or more of the segments for each route in the plurality of candidate routes. Method 2000 may include receiving data associated with the vehicle (step 2003), such as a current state of charge. Furthermore, method 2000 may make use of the aforementioned data to estimate an energy expenditure for the each route of the plurality of routes (step 2005), wherein the energy expenditure may be estimated for each route based on the previously discussed embodiments.

Method 2000 may include computing a figure of merit for each route in the plurality of routes (step 2007). In one embodiment, method 2000 may use an overall fuel consumption rate (or, in another embodiment, overall propulsion system efficiency) for the totality of the trip from first point 2 to second point 7 for each of the route as a figure of merit. An optimum route may be chosen based on the figures of merit of the routes. For example, in an embodiment, the route having the smallest fuel consumption rate may be chosen as the optimum route.

In other embodiments, method 2000 may include ranking the plurality of routes based on at least their figures of merit and several other parameters. Other parameters may be, for example, the length of the trip for each route, the location of the routes, the number of stops and traffic lights along each route, or the presence or absence of toll booths along each route. These parameters may all be used to further rank and/or select an optimum route. Once an optimum route has been selected (step 2009), method 2000 may include scheduling a protocol (step 2011) in a fashion similar to that described with respect of method 1000. Once the protocol is scheduled, the protocol may be applied to the vehicle (step 2013).

In practical applications, all of the methods and techniques previously described may be implemented using a computer, which may be an embedded computer system. The system may perform all of the functions previously described, or it may perform some of them, depending on the application. For example, in an embodiment, a system may simply perform mode scheduling for a given route without being configured to rank and/or select the route from a set of routes. In some embodiments, however, the system may be able to perform all of these functions.

Figure 9:
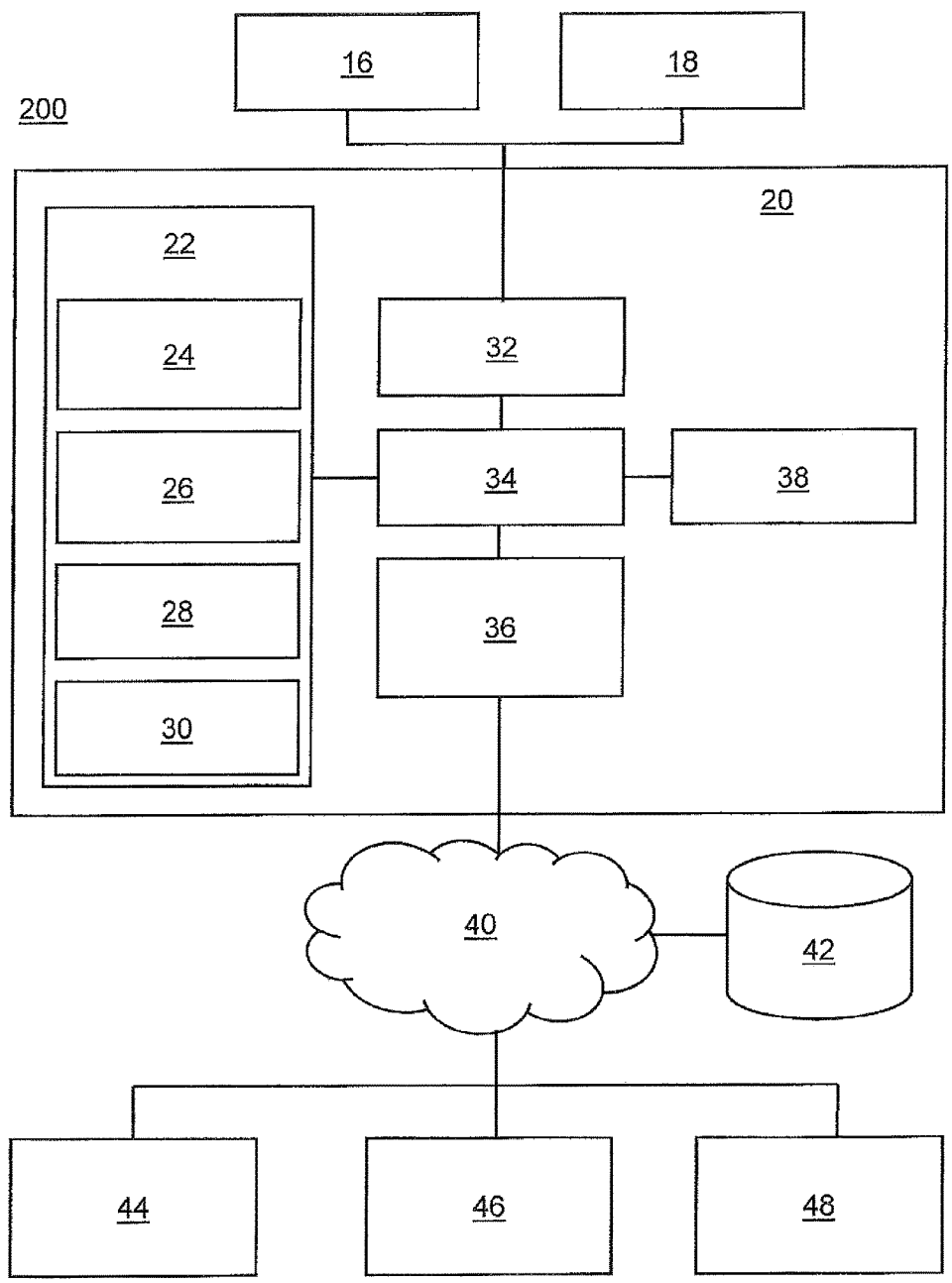
FIG. 9 illustrates a system, according to an exemplary embodiment.

FIG. 9 illustrates such an exemplary system (200). The various components of system 200, as well as their interconnections and functions are discussed below.

System 200 may be configured for estimating the energy that is to be expended by a vehicle over the course of a route that the vehicle is expected to take. System 200 may also be configured to schedule a protocol for controlling the vehicle's operation mode in order to minimize the energy consumed by the vehicle over the route to be taken, in view of the energy estimate. Moreover, system 200 may also be configured to select an optimum route, given a plurality of candidate routes. An optimum route may be thought of herein as a route that either maximizes or minimizes a figure of merit, depending on the application at hand. Further, the figure of merit may be based on at least an estimate of the energy to be consumed by a vehicle over a given a candidate route.

System 200 may include one or more hardware and/or software components configured to fetch, decode, execute, store, analyze, distribute, evaluate, and/or categorize information relating to the various functions and applications discussed herein. In some embodiments, the entirety of system 200 may be located in the vehicle as a built-in module included in the vehicle during manufacture. In other embodiments, system 200 may be an after-market module that may be connected to or coupled to an interface located in the vehicle, the interface having been included in the vehicle during manufacture.

System 200 may include a global positioning system (GPS) module 16, a vehicle controller 18, and a sub-system 20. GPS module 16 may be configured to provide geographical data regarding routes to be taken by the vehicle as well as the current position of the vehicle. Vehicle controller 18 may be a hardware device configured to diagnose and report one or more attributes of the vehicle. For example, in some embodiments, vehicle controller 18 may be configured to measure and report at least one of a speed, an acceleration, a state of charge of the battery, a fuel tank level, and a level of the vehicle. (The latter may serve as an estimation of the grade of the road on which the car is travelling.) These measurements may be made and reported instantaneously or they may be logged and tabulated against a time duration of the measurement. They may also be tabulated against position data provided by GPS module 16. Vehicle controller 18 may also be configured to control a mode of operation of the vehicle, upon receiving an instruction to do so from processor 34. For example, in some embodiments, vehicle controller 18 may be configured to switch the vehicle's operation between a hybrid mode of operation and an all-electric mode of operation. It should be noted that one of skill in the relevant art(s) will appreciate that in embodiments of the present disclosure, the aforementioned measurements may be made using sensors commonly available for measuring vehicle data without departing from the scope of the disclosure.

Sub-system 20 may include one or more processors 34, a storage device 38, a memory 22, an input/output (I/O) module 32, and a communication network interface 36. System 200 may be connected to a communication network 40 via network interface 36. As such, system 200 may be communicatively coupled to a database 42. While FIG. 2 illustrates only one database (database 42), one of ordinary skill in the relevant art(s) will readily recognize that system 200 may be communicatively coupled to several databases.

Furthermore, system 200 may be communicatively coupled to one or more data centers, of which only three are shown for the sake of simplicity (data center 44, data center 46, and data center 48). In some embodiments, database 42 may be co-located with one of data center 44, data center 46, and data center 48. In other embodiments, database 42 may distributed over data center 44, data center 46, and data center 48.

In some embodiments, GPS module 16 may be separate from system 200, and vehicle controller 18 may be separate from system 200 as well. In such embodiments, network interface 36 may be configured to provide connectivity between sub-system 20 and GPS module 16 and controller 18, in addition to providing connectivity to network 40.

System 200 may be configured to function as a client device communicatively coupled to a server (not shown) via network 40. The server may be located at one data center, or it may be distributed over a plurality of data centers. In some embodiments, system 200 may be a personal digital assistant (PDA), a tablet personal computer (PC), or it may be implemented on a smart phone. In other embodiments, as mentioned above, system 200 may be included within the vehicle, such as built-in navigation modules included in a wide variety of new automobiles.

In some embodiments, I/O module 32 may include a keyboard for input as well as fan-out terminals that may provide one or more paths for connection to controller 18. In other embodiments, I/O module 32 may include a touchscreen interface for input and one or more displays for visual output, such as for example a view screen. In other embodiments, I/O module 32 may include software and hardware that allow voice input. One of skill in the relevant art(s) will readily appreciate that all the input and output methods described above with respect to I/O module 32 may be provided concurrently, without departing from the scope of the present disclosure.

Processor 34 may include one or more processing devices or cores (not shown). In some embodiments, processor 34 may be a plurality of processors, each having either one or more cores. The plurality of processors may be configured for parallel execution of instructions from memory 22 or instructions located in storage device 38. Further, processor 34 may be one or more microprocessors, such as one or more microprocessors from the Pentium™ family manufactured by Intel™, the Turion™ family manufactured by AMD™, or any other type of microprocessor.

As shown in FIG. 9, processor 34 may be communicatively coupled to storage device 38, memory 22, I/O module 32, and network interface 36. As such, processor 34 may be configured to execute software or firmware instructions, routines, or sub-routines that are designed to cause processor 34 to perform a variety of functions and/or operations consistent with certain embodiments of the present disclosure. In one exemplary embodiment, instructions may be loaded into the various modules of memory 22 for execution by processor 34.

Storage device 38 may include a volatile or non-volatile, magnetic, semiconductor, tape, optical, removable, non-removable, read-only, random-access, or other type of storage device or computer-readable computer medium. Storage device 38 may include programs and/or other information that may be used by processor 34. Furthermore, storage 38 may be configured to log data processed, recorded, or collected during the operation of system 200. The data may be time-stamped, cataloged, indexed, or organized in a variety of ways consistent with data storage practice without departing from the scope of the present disclosure.

Communication network interface 36 may include one or more components configured to transmit and receive data via communication network 40, such as one or more modulators, demodulators, multiplexers, de-multiplexers, network communication devices, wireless devices, antennas, modems, and any other type of device configured to enable data communication via any suitable communication network. Furthermore, communication network 40 may be any appropriate network allowing communication between or among one or more computing systems, such as, for example, the Internet, a local area network, or a wide area network.

Having set forth the structure and function of the various modules included in exemplary system 200, operations consistent with embodiments of the present disclosure are now described. Such operations may include retrieving data, processing the data, and issuing commands via I/O module 32 or broadcasting data over network 40.

Memory 22 may include one or more modules configured to store information used by system 200 to perform certain functions related to the disclosed exemplary embodiments. In one embodiment, memory 22 may include a data retrieving module 24. Data retrieving module 24 may be a set of instructions that when executed by processor 34 cause processor 34 to broadcast a request over network 40 via interface 36. The request may be directed at one of, or at least one of, data centers 44, 46, and 48 or it may be a read operation directed to obtain data from database 42. In some embodiments, the request may include data obtained by processor 34 from GPS module 16. For example, in one embodiment, processor 34 may execute instructions located in module 24 to obtain candidate route data, i.e., data associated with a route to be taken by the vehicle.

The request for candidate route data may include parameters obtained from GPS module 16. The parameters may be geographical data (latitude and longitude pairs) as well as waypoints along a route to be taken by the vehicle. Once the request is received by the appropriate entity (i.e., data centers 44, 46, 48, and/or database 42), the requested data (i.e., the candidate route data) may be transmitted to system 200 by the entity. In some embodiments, the candidate route data transmitted in response to the request may be stored into storage device 38 once received. The candidate route data may include a plurality of drive cycle metrics associated with segments located between two waypoints along the route. In some embodiments, the drive cycle metrics may include a road grade profile corresponding to the candidate route and/or to segments of the candidate routes.

In some embodiments, data retrieving module 24 may be configured to request a state of the vehicle. In such embodiments, processor 34 may execute the instructions located in module 24 to broadcast a request to vehicle controller 18 via I/O module 32. Vehicle controller 38 may, upon receiving the request and using appropriate sensors located in the vehicle, measure the state of one or of several attributes of the vehicle and subsequently transfer a diagnostics report back to processor 34 via I/O module 32. The diagnostics report may be stored in storage device 38 once received. In some embodiments, the diagnostics report may include at least one of a state of charge of the battery of the vehicle and the current fuel level of the vehicle.

In some embodiments, memory 22 may include an estimation module 26. Module 26 may include instructions that cause processor 34 to use the diagnostics report and candidate route data stored in storage device 38 to estimate the energy that the vehicle would expend by taking a candidate route. In some embodiments, the instructions of module 26 may cause processor 34 to use the cycle metrics and at least one of the state of charge of the battery and the current fuel level to estimate the energy that the vehicle would expend by taking the candidate route. Estimation of the energy may be undertaken as described above, in the context of methods 1000 and methods 2000. Briefly speaking, the cycle metrics and the state of the vehicle may be correlated with energy measures by comparing them with values from a high-level look up table. The look-up table may be included in database 42, or in storage device 38, or alternatively, in at least one of data centers 44, 46, and 48. In some embodiments, system 200 may be configured to update the look-up table to reflect data associated with routes recently taken by the vehicle in which system 200 is located. As such, system 200 may be configured to ensure the continual updating of the look-up table with recent data, thus making future predictions more accurate (especially for vehicles that may be using a system like system 200 but that have not yet traveled where the vehicle associated with system 200 has).

System 200 may also include a scheduling module 28, which may contain instructions that cause processor 34 to perform scheduling operations for a given candidate route. Scheduling may entail storing instructions within module 28 that cause processor 34 to schedule a mode of operation for the vehicle. Processor 34 may do this by outputting control signals to vehicle controller 18 to modulate operation between an all-electric mode and a hybrid mode, for example, upon executing the instructions in module 28. As such, module 28 may include instructions that cause processor 34 to produce signals that would trigger the vehicle to change its operation as need via controller 18, and as described with respect to methods 1000 and 2000. Module 28 may include instructions that cause processor 34 to compute cost/benefit figures for segments of routes, as well as check whether a given criterion (such as the one in equation 1) is met, before instructing vehicle controller 18 to change an operational mode of the vehicle.

Moreover, system 200 may also include a selection module 30, which may include instructions that cause processor 34 to select an optimum route as discussed above with respect to method 2000. Selection of a route may be based upon processor 34 computing figures of merit for a plurality of routes, and then selecting an optimum route based on a criterion applied to the figures of merit. For example, in one embodiment, the figures of merit may be a total fuel consumption rate associated with a specified route to be taken during a trip. Accordingly, in embodiments of the present disclosure, selection module 30 may include instructions that cause processor 34 to select the route having the smallest figure of merit, i.e., the smallest fuel consumption rate. Other criteria and figures of merit may be used, as discussed above with respect to method 2000.

Those skilled in the art will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A method comprising:
receiving, from a computer comprising a processor, drive metrics associated with a plurality of segments of a route that has not been previously traveled by a hybrid vehicle or for which the drive metrics are unavailable;
wherein the hybrid vehicle has both a fuel powertrain that includes an engine powered by a fuel and an electric powertrain powered by electricity such that the hybrid vehicle is transitionable between:
a hybrid mode of operation in which both the fuel and electricity propel the hybrid vehicle; and
an all-electric mode of operation in which electricity exclusively propels the hybrid vehicle; and
wherein:
each of the plurality of segments comprises a particular distance to be covered by the hybrid vehicle; and
the drive metrics comprise a plurality of drive cycle profiles relating to one or more portions of the route that has not been previously traveled by the hybrid vehicle or for which the drive metrics are unavailable;
receiving from the computer data comprising information received by one or more systems of the hybrid vehicle;
determining, by the computer and based on the drive metrics and the data, for each of the plurality of segments, a cost benefit ratio corresponding to:
a cost of substituting the hybrid mode of operation for the all-electric mode of operation; and
a benefit of a reduction in an electric depletion rate based on a difference between an electric depletion rate of the all-electric mode of operation and an electric depletion rate of the hybrid mode of operation; and
scheduling a protocol to prioritize, for at least one of the plurality of segments, operation of the hybrid vehicle in the hybrid mode of operation over operation in the all-electric mode of operation based on the cost benefit ratio determined for the at least one of the plurality of segments as compared to at least one other cost benefit ratio determined for at least one other of the plurality of segments.

2. The method of claim 1, wherein the drive metrics are a measure of at least one of a speed and an acceleration.

3. The method of claim 2, wherein the speed and the acceleration are historical speed and acceleration data associated with the plurality of segments.

4. The method of claim 1, wherein the protocol includes directing the hybrid vehicle to operate according to the protocol in a scheduled one of the all-electric mode of operation and the hybrid mode of operation when the hybrid vehicle is at one of the plurality of segments of the route that has not been previously traveled by the hybrid vehicle or for which the drive metrics are unavailable.

5. The method of claim 1, wherein scheduling the protocol further includes prioritizing, for at least one of the plurality of segments, operation of the hybrid vehicle in the hybrid mode of operation over operation in the all-electric mode of operation such that a predicted final state of charge of a battery of the hybrid vehicle at an end of the route that has not been previously traveled by the hybrid vehicle or for which the drive metrics are unavailable meets or exceeds a predetermined state of charge.

6. The method of claim 1, wherein, for each of the plurality of segments, the cost of substituting the hybrid mode of operation for the all-electric mode of operation includes the cost of an amount of fuel that would be consumed by operating in the hybrid mode of operation.

7. The method of claim 1, wherein the hybrid vehicle data includes a state of charge of a battery of the hybrid vehicle.

8. A system comprising:
a processor;
a memory storing instructions that when executed by the processor cause the processor to perform operations including:
receiving drive metrics associated with a plurality of segments of route that has not been previously traveled by a hybrid vehicle or for which the drive metrics are unavailable;
wherein the hybrid vehicle includes an engine powered by a fuel and an electric powertrain powered by electricity such that the hybrid vehicle is transitionable between:
a hybrid mode of operation in which both the fuel and electricity propel the hybrid vehicle; and
an all-electric mode of operation in which electricity exclusively propels the hybrid vehicle; and
wherein:
each of the plurality of segments comprises a particular distance to be covered by the hybrid vehicle; and
the drive metrics comprise a plurality of drive cycle profiles relating to one or more portions of the route that has not been previously traveled by the hybrid vehicle or for which the drive metrics are unavailable;
receiving data comprising information received by one or more systems of the hybrid vehicle; and
determining, based on the drive metrics and the data, for each of the plurality of segments, a cost benefit ratio corresponding to:
a cost of substituting the hybrid mode of operation for the all-electric mode of operation; and
a benefit of a reduction in an electric depletion rate based on a difference between an electric depletion rate of the all-electric mode of operation and an electric depletion rate of the hybrid mode of operation; and
scheduling a protocol to prioritize, for at least one of the plurality of segments, operation of the hybrid vehicle in the hybrid mode of operation over operation in the all-electric mode of operation based on the cost benefit ratio determined for the at least one of the plurality of segments as compared to at least one other cost benefit ratio determined for at least one other of the plurality of segments.

9. The system of claim 8, wherein the operations comprise directing the hybrid vehicle to operate according to the protocol in a scheduled one of the all-electric mode of operation and the hybrid mode of operation when the hybrid vehicle is at one of the plurality of segments of the route that has not been previously traveled by the hybrid vehicle or for which the drive metrics are unavailable.

10. The system of claim 8, wherein scheduling the protocol includes prioritizing, for at least one of the plurality of segments, operation of the hybrid vehicle in the hybrid mode of operation over operation in the all-electric mode of operation such that a predicted final state of charge of a battery of the hybrid vehicle at an end of the route that has not been previously traveled by the hybrid vehicle or for which the drive metrics are unavailable meets or exceeds a predetermined state of charge.

11. The system of claim 8, wherein, for each of the plurality of segments, the cost of substituting the hybrid mode of operation for the all-electric mode of operation includes the cost of an amount of fuel that would be consumed by operating in the hybrid mode of operation.

12. The system of claim 8, wherein the drive metrics are a measure of at least one of a speed and an acceleration.

13. The system of claim 8, wherein the hybrid vehicle data includes a state of charge of a battery of the hybrid vehicle.

\* \* \* \* \*